US008670156B2

(12) United States Patent
Shiraishi

(10) Patent No.: US 8,670,156 B2
(45) Date of Patent: Mar. 11, 2014

(54) IMAGE PROCESSING DEVICE, IMAGE PROCESSING METHOD, AND IMAGE FORMING APPARATUS

(71) Applicant: Naoto Shiraishi, Kanagawa (JP)

(72) Inventor: Naoto Shiraishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/710,716

(22) Filed: Dec. 11, 2012

(65) Prior Publication Data

US 2013/0155466 A1 Jun. 20, 2013

(30) Foreign Application Priority Data

Dec. 14, 2011 (JP) ................... 2011-273891

(51) Int. Cl.
*G06K 15/00* (2006.01)
*H04N 1/40* (2006.01)
(52) U.S. Cl.
USPC ........................... 358/3.06; 358/3.2; 358/3.22
(58) Field of Classification Search
USPC ................ 358/3.06, 3.11, 3.14, 3.3, 534–536
See application file for complete search history.

(56) References Cited

U.S. PATENT DOCUMENTS

| 6,081,274 A | 6/2000 | Shiraishi |
| 2002/0075532 A1 | 6/2002 | Shiraishi |
| 2003/0053701 A1 | 3/2003 | Shiraishi |
| 2003/0063813 A1 | 4/2003 | Shiraishi |
| 2004/0150656 A1 | 8/2004 | Shiraishi |
| 2005/0062994 A1 | 3/2005 | Shiraishi |
| 2005/0151991 A1 | 7/2005 | Shiraishi |
| 2005/0207667 A1 | 9/2005 | Shiraishi |
| 2005/0249427 A1 | 11/2005 | Shiraishi |
| 2006/0072142 A1 | 4/2006 | Shiraishi |
| 2006/0193528 A1 | 8/2006 | Shiraishi |
| 2009/0060325 A1 | 3/2009 | Shiraishi |
| 2009/0128857 A1 | 5/2009 | Shiraishi |
| 2010/0238467 A1 | 9/2010 | Shiraishi |
| 2011/0033125 A1 | 2/2011 | Shiraishi |
| 2011/0063143 A1 | 3/2011 | Shiraishi |
| 2011/0228325 A1 | 9/2011 | Shiraishi |
| 2011/0273736 A1 | 11/2011 | Shiraishi |
| 2011/0280492 A1 | 11/2011 | Shiraishi |
| 2012/0155779 A1 | 6/2012 | Shiraishi |

FOREIGN PATENT DOCUMENTS

| JP | 3446324 | 7/2003 |
| JP | 4490783 | 4/2010 |

OTHER PUBLICATIONS

U.S. Appl. No. 13/482,228, filed May 29, 2010, Naoto Shiraishi.
U.S. Appl. No. 13/633,464 filed Oct. 2, 2010, Naoto Shiraishi.

*Primary Examiner* — Barbara Reinier
(74) *Attorney, Agent, or Firm* — Cooper & Dunham LLP

(57) ABSTRACT

An image processing device includes storage units to store a first halftone pattern subjected to a halftone processing for a first color gradation value, a second halftone pattern subjected to a halftone processing for a second color gradation value, and a brush pattern. The device further includes shift units to shift each pattern read on the basis of a predetermined unit from each of storage units to a first direction toward a drawing start point on the horizontal line according to a drawing position on the horizontal line, further add each pattern to a second direction toward a drawing end point on the horizontal line, and output each on the basis of the predetermined unit. The device further includes a brush synthesizing unit to select, pixel by pixel, either the first halftone pattern or the second halftone pattern, according to the brush pattern.

6 Claims, 19 Drawing Sheets

FIG.5

| C VERSION BAND INITIALIZATION COMMAND | Y VERSION BAND INITIALIZATION COMMAND |
|---|---|
| BRUSH PATTERN SET COMMAND | Y VERSION THRESHOLD VALUE TABLE SET COMMAND |
| C VERSION THRESHOLD VALUE TABLE SET COMMAND | Y VERSION DRAWING GRADATION VALUE DEFINITION COMMAND |
| C VERSION DRAWING GRADATION VALUE DEFINITION COMMAND | Y VERSION SQUARE DRAWING COMMAND |
| C VERSION SQUARE DRAWING COMMAND | Y VERSION TRIANGLE DRAWING COMMAND |
| C VERSION TRIANGLE DRAWING COMMAND | Y VERSION DRAWING GRADATION VALUE DEFINITION COMMAND |
| C VERSION DRAWING GRADATION VALUE DEFINITION COMMAND | Y VERSION SQUARE DRAWING COMMAND |
| C VERSION SQUARE DRAWING COMMAND | Y VERSION BAND END COMMAND |
| C VERSION BAND END COMMAND | K VERSION BAND INITIALIZATION COMMAND |
| M VERSION BAND INITIALIZATION COMMAND | K VERSION THRESHOLD VALUE TABLE SET COMMAND |
| M VERSION THRESHOLD VALUE TABLE SET COMMAND | K VERSION DRAWING GRADATION VALUE DEFINITION COMMAND |
| M VERSION DRAWING GRADATION VALUE DEFINITION COMMAND | K VERSION SQUARE DRAWING COMMAND |
| M VERSION SQUARE DRAWING COMMAND | K VERSION TRIANGLE DRAWING COMMAND |
| M VERSION TRIANGLE DRAWING COMMAND | K VERSION DRAWING GRADATION VALUE DEFINITION COMMAND |
| M VERSION DRAWING GRADATION VALUE DEFINITION COMMAND | K VERSION SQUARE DRAWING COMMAND |
| M VERSION SQUARE DRAWING COMMAND | K VERSION BAND END COMMAND |
| M VERSION BAND END COMMAND | |

FIRST COLOR HALFTONE PATTERN VALUE

SECOND COLOR HALFTONE PATTERN VALUE

BRUSH PATTERN VALUE

FIRST COLOR HALFTONE PATTERN VALUE AFTER CYCLIC SHIFT

SECOND COLOR HALFTONE PATTERN VALUE AFTER CYCLIC SHIFT

BRUSH PATTERN VALUE AFTER CYCLIC SHIFT

PATTERN VALUE AFTER BRUSH TREATMENT

PRIOR ART
FIG.20A  FIG.20B  FIG.20C
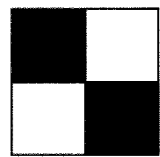 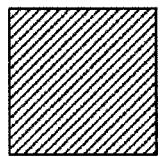 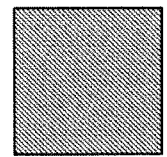
FIG.20D
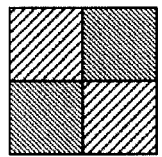

IMAGE PROCESSING DEVICE, IMAGE PROCESSING METHOD, AND IMAGE FORMING APPARATUS

CROSS-REFERENCE TO RELATED APPLICATIONS

The present application claims priority to and incorporates by reference the entire contents of Japanese Patent Application No. 2011-273891 filed in Japan on Dec. 14, 2011.

BACKGROUND OF THE INVENTION

1. Field of the Invention

The present invention relates to an image processing device and an image processing method, and an image forming apparatus, which are suitable for image forming onto a printing medium.

2. Description of the Related Art

In the fields of page printers or the like, high resolution printing and high speed printing are conventionally required. However, these requirements become harder to be satisfied only by performances of CPUs (Central Processing Unit) for controlling operations of printers. Particularly, in color printers, numerous processing such as drawing processing for respective color component images of Cyan (C), Magenta (M), Yellow (Y) and Black (K), color conversion processing, and halftoning (also called a halftone processing) are required in addition to various image processing.

A conventional printing operation can be schematically described as follows. Data such as PDL (Page Description Language) data generated by a personal computer (PC) or the like is transferred to a printer via a predetermined interface such as network and cable. The printer analyzes the transferred PDL data to generate an intermediate language executable by a drawing unit of the printer. The drawing unit analyzes the generated intermediate language to generate image data, and performs a gradation processing on the generated image data to obtain binary image data. The binary image data is drawn to a band memory so that the binary image data is stored in the band memory. The image drawing is performed for each color component image of C, M, Y and K.

The printer encodes the each color component image data drawn to the band memory according to a binary image compression algorithm such as JBIG (Joint Bi-level Image Coding Expert Group), and writes the encoded data into the memory for each color component. When printing, the printer reads the encoded data from the memory delayed for each color component image of C, M, Y and K to decode the data. The printer transfers the decoded data to a printer engine corresponding to each of C, M, Y and K, so that the printing is performed.

A halftoning is one of gradation processing to convert multivalued gradation image data into binary image data suitable for the printing. According to the halftoning, a binary pattern corresponding to the gradation value is applied to the multivalued gradation image data having gradation tone or the like. It is possible to obtain the binary image corresponding to the desired gradation value by changing the proportion of the binary pattern in a predetermined area.

With regard to the halftoning, for example, Japanese Patent No. 3446324 discloses, a technique in which a halftone pattern is generated by performing a bit shifting of a basic pattern of a halftone pattern, and a drawing unit is started to draw the generated halftone pattern by means of a halftone repeating function, so that the halftone pattern is generated by means of the least common multiple of a basic bit pattern width and a memory boundary width of the drawing unit.

Furthermore, for example, Japanese Patent No. 4490783 discloses a technique in which at least Y width of a halftone pattern having a drawing word X width is stored into a halftone storage unit, and a cyclic shift processing corresponding to a halftone pattern shift value is performed by using the halftone pattern corresponding to a halftone pattern address value. According to the Japanese Patent No. 4490763, it is possible to repeatedly use the halftone pattern for drawing objects having the same gradation value. Therefore, different from Japanese Patent No. 3446324, the memory capacity can be saved without generating the halftone pattern by means of least common multiple of the basic bit pattern and the memory boundary width of the drawing unit.

On the other hand, a brush treatment is one of image processing in printers. The brush treatment is a treatment or processing to perform the drawing by generating desired colors from each color of R, G, and B, for example.

In the image processing in printers, conventionally, the drawing is performed through the brush treatment, and the drawn image data is subjected to the gradation processing by halftoning. Namely, one page image is subjected to the brush treatment, and this brush treated one page image is subjected to the halftoning. Thereby, a memory is required which can store one page image data. This raises the cost.

Therefore, a brush treatment is conventionally known in which a first color illustrated in FIG. 20B and a second color illustrated in FIG. 20C are respectively applied to binary brush pattern values "1" and "0" illustrated in FIG. 20A, so that the first color and the second color is selectively drawn.

In the technique of Japanese Patent No. 4490783, the halftoning repeatedly uses the halftone pattern. Therefore, the required memory capacity can be reduced. However, the Japanese Patent No. 4490783 does not disclose the brush treatment at all. Therefore, it was difficult to apply the technique disclosed by Japanese Patent No. 4490783 to the brush treatment illustrated by using FIG. 20.

SUMMARY OF THE INVENTION

It is an object of the present invention to at least partially solve the problems in the conventional technology.

An image processing device includes a first storage unit configured to be accessed on the basis of a predetermined unit in X direction which is a direction along a horizontal line, and configured to store a first halftone pattern subjected to a halftone processing for a first color gradation value, a second storage unit configured to be accessed on the basis of a predetermined unit in the X direction, and configured to store a second halftone pattern subjected to a halftone processing for a second color gradation value, a third storage unit configured to be accessed on the basis of a predetermined unit in the X direction, and configured to store a brush pattern, a first shift unit configured to shift the first halftone pattern read on the basis of the predetermined unit from the first storage unit to a first direction toward a drawing start point on the horizontal line according to a drawing position on the horizontal line, further add the first halftone pattern to a second direction toward a drawing end point on the horizontal line, and output it on the basis of the predetermined unit, a second shift unit configured to shift the second halftone pattern read on the basis of the predetermined unit from the second storage unit to the first direction according to the drawing position, further add the second halftone pattern to the second direction, and output it on the basis of the predetermined unit, a third shift unit configured to shift the brush pattern read on the basis of the predetermined unit from the third storage unit to the first direction according to the drawing position, further add the brush pattern to the second direction, and output it on the basis of the predetermined unit, and a brush synthesizing unit configured to select, pixel by pixel, which one of the first halftone pattern based on the predetermined unit output from the first shift unit and the second halftone pattern based on the predetermined unit output from the second shift unit should be output, according to the brush pattern based on the predetermined unit output from the third shift unit.

An image processing method includes a first shifting for shifting a first halftone pattern subjected to a halftone processing for a first color gradation value, the first halftone pattern being read on the basis of a predetermined unit from a first storage unit configured to be accessed on the basis of the predetermined unit in X direction which is a direction along a horizontal line and configured to store the first halftone pattern, to a first direction toward a drawing start point on the horizontal line according to a drawing position on the horizontal line, further adding the first halftone pattern to a second direction toward a drawing end point on the horizontal line, and outputting it on the basis of the predetermined unit, a second shifting for shifting a second halftone pattern subjected to a halftone processing for a second color gradation value, the second halftone pattern being read on the basis of a predetermined unit from a second storage unit configured to be accessed on the basis of the predetermined unit in the X direction and configured to store the second halftone pattern, to the first direction according to the drawing position, further adding the second halftone pattern to the second direction, and outputting it on the basis of the predetermined unit, a third shifting for shifting a brush pattern, the brush pattern being read on the basis of a predetermined unit from a third storage unit configured to be accessed on the has of the predetermined unit in the X direction and configured cc store the brush pattern, to the first direction according to the drawing position, further adding the brush pattern to the second direction, and outputting it on the basis of the predetermined unit, and a brush synthesizing for selecting, pixel by pixel, which one of the first halftone pattern based on the predetermined unit output from the first shifting and the second halftone pattern based on the predetermined unit output from the second shifting should be output, according to the brush pattern based on the predetermined unit output from the third shifting.

An image forming apparatus includes the aforementioned image processing device and an image forming unit configured to form an image on a printing medium according to an output from the brush synthesizing unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of intermediate language to be processed by the drawing unit;

FIGS. 20A to 20D are diagrams illustrating conventional brush treatment.

DETAILED DESCRIPTION OF THE PREFERRED EMBODIMENTS

Figure 1:
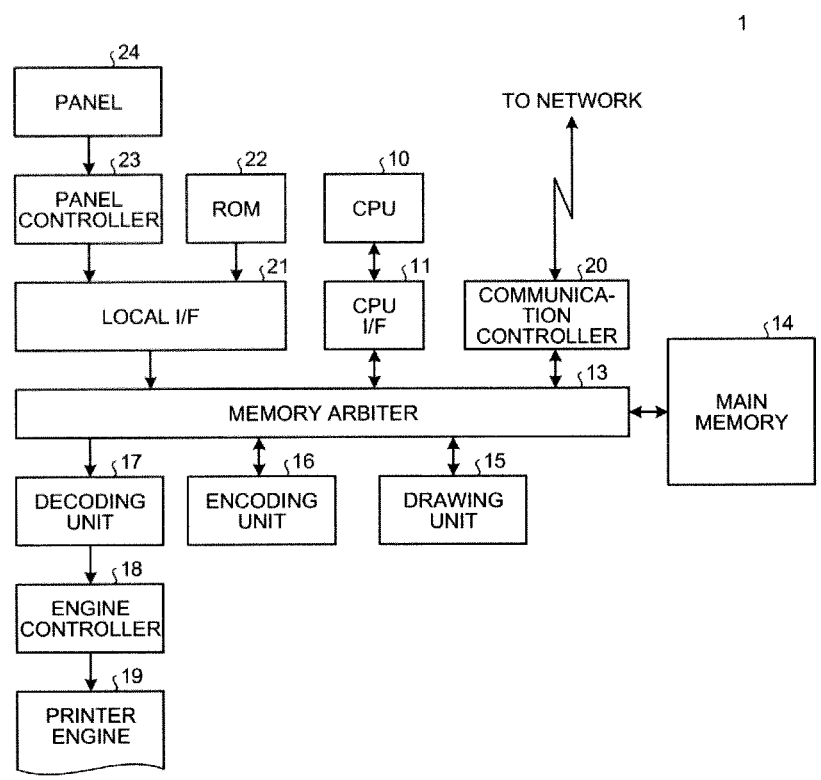
FIG. 1 is a block diagram illustrating an exemplary configuration of an image forming apparatus according to an embodiment.

Hereinafter, the image processing device, the image processing method, and the image forming apparatus are described in detail with reference to the accompanying drawings.

Outline of Embodiment

In the present embodiment, when the intermediate language is generated, the drawing objects having the same gradation value are collected. In front of the collected object, a command to define a halftone threshold value table, a command to set the first and second color gradation value, and a command to define a brush size and a brush pattern table are designated. Then, according to the command to define the threshold value table, two dimensional (2D) threshold value table containing X width and Y width of the halftone pattern in the drawing processing is set. The set threshold value table is stored in the memory.

According to the command to define gradation values of the first color and the second color, the threshold value table is read from the memory. According to the threshold value table, the halftoning is performed for each of gradation values of the first color and the second color. The two dimensional halftone pattern made of X width and Y width of the halftone pattern is obtained for each of gradation values of the first color and the second color. The drawing is performed while these two dimensional halftone patterns of the first color and the second color are switched on the basis of the brush pattern.

In the present embodiment, according to the above processing, the halftone pattern can be efficiently applied to the drawing objects having the same gradation value. Therefore, it is not necessary to successively access the memory in which the halftone threshold value table is stored. Thereby, it is possible to perform the brush treatment more rapidly.

In the present embodiment, furthermore, the halftone pattern and the brush pattern are obtained successively for each drawing word to be drawn from a horizontal shift value of the halftone pattern and a horizontal shift value of the brush pattern. Therefore, it is possible to reduce or limit capacities of the memory for storing the halftone pattern and the memory for storing the brush pattern.

Details of Embodiments

FIG. 1 is a block diagram illustrating an exemplary configuration of an image forming apparatus 1 according to an embodiment. In the image forming apparatus 1, a CPU (Central Processor Unit) 10 is connected to a memory arbiter 13 via a CPU I/F 11, and a ROM (Read Only Memory) 22 and a panel controller 23 are connected to the memory arbiter 13 via a local I/F 21. The memory arbiter 13 has a memory controller. A main memory 14 is connected to the memory arbiter 13 via the memory controller. Furthermore, a drawing unit 15, an encoding unit 16, a decoding unit 17, and a communication controller 20 are connected to the memory arbiter 13. An output of the decoding unit 17 is connected to an engine controller 18 which controls a printer engine 19.

The memory arbiter 13 arbitrates data transfers among various units connected to the memory arbiter 13. The CPU I/F 11 is an interface between the CPU 10 and the memory arbiter 13. The CPU 10 is connected to various units or parts of the image forming apparatus 1 via the CPU I/F 11 and the memory arbiter 13. To the panel controller 23, a panel 24 is connected. In the panel 24, an operating member and a displaying member for user's operation are arranged.

In ROM 22, various programs and font information such as character font are preinstalled or prestored. According to the preinstalled program in the ROM 22, the CPU 10 controls operations of the image forming apparatus 1 by using a RAM (Random Access Memory) as a working memory. The CPU 10 can use the main memory 14 as a working memory. The CPU 10 sends a command to the engine controller 18, the command for controlling the printer engine 19. The communication controller 20 controls communications with external devices such as personal computers (PCs) connected to the apparatus via network.

The access to the main memory 14 via the memory arbiter 13 is controlled by the memory controller included in the memory arbiter 13. The main memory 14 may include for example a PDL storage area, an intermediate language storage area, a band storage area, and a page code storage area. In the PDL storage area, a PDL (Page Description Language) which may for example be sent from the personal computer via the communication controller 20 is stored. In the intermediate language storage area, an intermediate language generated on the basis of the PDL is stored. In the band storage area, the band image data generated in accordance with the PDL is stored. In the page code storage area, encoded band image data is stored. Furthermore, in the main memory 14, an area in which programs for operating the CPU 10 are stored, or an area which is used as a working memory by the CPU 10 is arranged.

The drawing unit 15 reads and analyzes the intermediate language generated on the basis of the PDL data by the CPU 10. According to the analyzed result, the drawing processing is performed to write the band image in the band storage area of the main memory 14. For example, the band image drawn by the drawing unit 15 is read from the main memory 14, subjected to the encoding and the decoding at the encoding unit 16 and the decoding unit 17 via the memory arbiter 13, and supplied to the engine controller 16. The engine controller 18 controls the printer engine 19 according to the supplied band image, so that an image is formed on the print medium and thus the printing is done.

Figure 2:
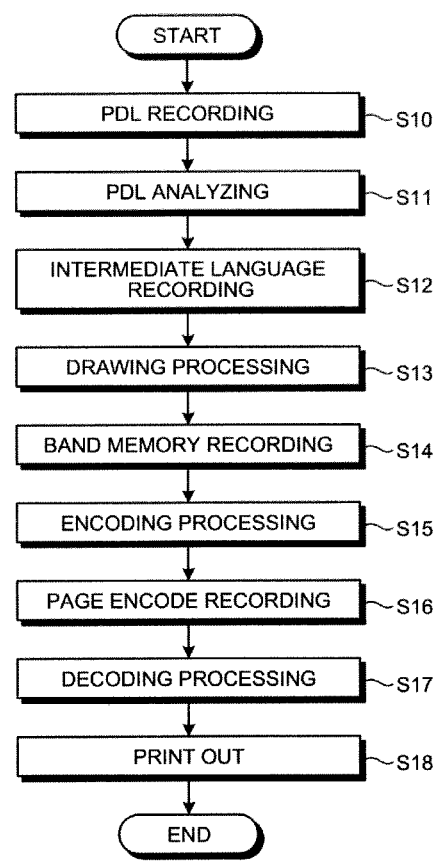
FIG. 2 is a flow chart illustrating an exemplary entire operation of the image forming apparatus according to the embodiment.

Referring to FIG. 2, an example of an entire operation of the image forming apparatus is explained. The PDL data which may be for example generated by the personal computer is received by the communication controller 20 via the network, and stored in the PDL storage area of the main memory 14 (step S10). The CPU 10 reads the PDL data from the PDL storage area of the main memory 14, and analyzes the PDL (step S11). According to the analyzed result, the CPU 10 generates the intermediate language, and stores it in the intermediate language storage area (step S12).

According to the intermediate language read from the intermediate language storage area, the drawing unit 15 performs the drawing processing to generate the image data (step S13). In this drawing processing, the halftoning and the brush treatment according to the embodiment are performed. The generated image data is successively written in the band storage area of the main memory 14 (step S14).

The encoding unit 16 reads the band image data from the band image storage area of the main memory 14, and compresses and encodes the read band image data according to a predetermined compress encoding system (step S15). The encoded data obtained by compressing and encoding the band image data is stored in the page code storage area of the main memory 14 (step S16). The decoding unit 17 reads the encoded data from the page code storage area and decodes it into the image data (step S17), and sends the decoded image data to the engine controller 18. According to the supplied image data, the engine controller 18 controls the printer engine 19 to perform the print out (step S18).

Figure 3:
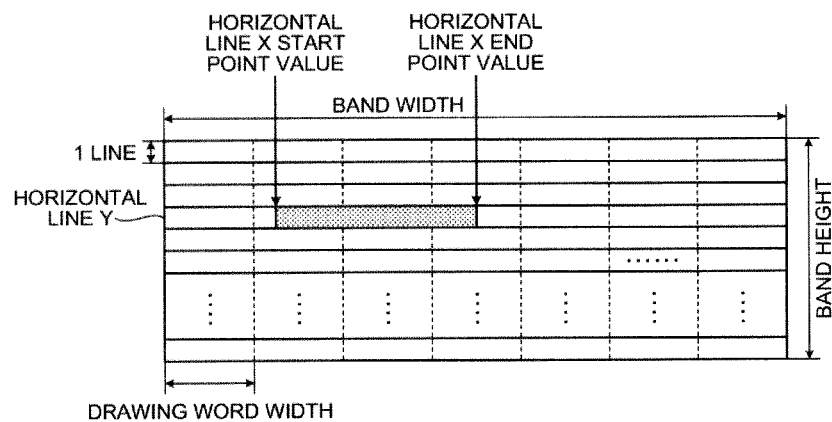
FIG. 3 is a diagram illustrating an exemplary format of a band storage area in a main memory.

The image writing into the band storage area of the main memory 14 at the step S14 is explained. FIG. 3 illustrates an exemplary format in the band storage area of the main memory 14. In an example of FIG. 3, a band width may be for example a width of one page, that is, a length of one horizontal line which is drawn by a horizontal scanning (main scanning). In the example of FIG. 3, a band height is a height of one region obtained by dividing one page into a predetermined number in a vertical direction. A drawing word width means an access unit with which the drawing unit 15 accesses the band storage area.

In FIG. 3, as an example of writing the image data into the band storage area, a horizontal line is drawn (written) from a horizontal line X start point to a horizontal line X end point. Thus, the drawing unit 15 performs the drawing by writing the image data subjected to the image processing into the band storage area for each one horizontal line. A direction along the horizontal line is referred to as X direction, and a direction vertical to the horizontal line that is a sub scanning direction is referred to Y direction. For example, a printing area in one page is represented by X and Y coordinates.

The intermediate language which is generated by the CPU 10 at the step S12 is explained. FIG. 4 illustrates exemplary commands based on the intermediate language processed by the drawing unit 15. In examples of FIG. 4, each command has a 32 bit data width. The leading 32 bits are serving as a command header. Following the command header, each parameter of the command is added. Each command can be designated for each color of C, M, Y, and K. NOP immediately after the command header is for aligning the data width of the command header to the 32 bit width. Hereinafter, the header including this NOP is referred to as the command header.

Figure 4A:
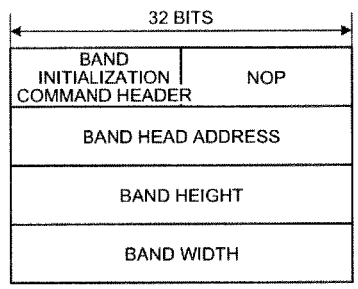
FIGS. 4A to 4G are diagrams illustrating examples of commands by means of intermediate language to be processed by a drawing unit.
Figure 4B:
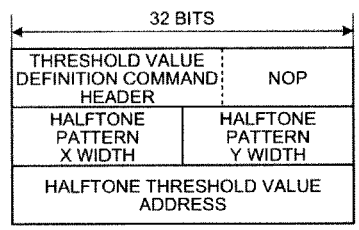

FIG. 4A illustrates an example of a band initialization command. In the band initialization command, various setting parameters including a band head address, a band height, and a band width are designated following the command header. FIG. 4B illustrates an example of a threshold value definition command for defining a threshold value table in the halftoning. Various parameters including a halftone pattern X width, a halftone pattern Y width, and a halftone head threshold value address are designated following the command header. The halftone head threshold value address indicates a head address at which the halftone threshold value is stored in a halftone threshold value storage unit 203 which will be described later relating to FIG. 8 and FIG. 9.

Figure 4C:
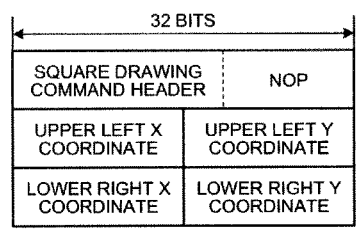
Figure 4D:
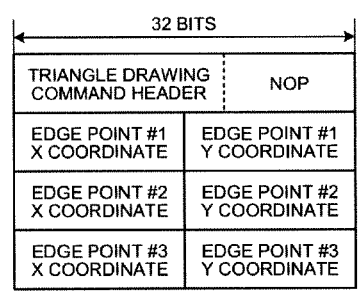

FIG. 4C illustrates an example of a square drawing command for commanding the drawing of a square. Various parameters including X and Y coordinates of the left upper corner (tip) of the square, and X and Y coordinates of the right lower corner (tip) of the square are designated following to the command header. FIG. 4D illustrates an example of a triangle drawing command for commanding the drawing of a triangle. X and Y coordinates of each of three points (tips) of the triangle are designated.

Figure 4E:
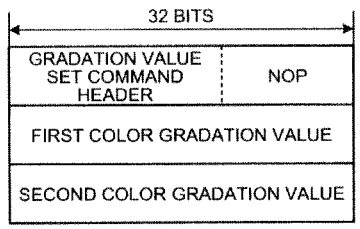
Figure 4F:
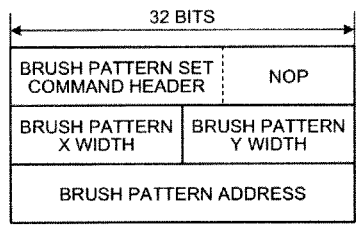

FIG. 4E illustrates an example of a gradation value set command for defining the gradation value. Various parameters for setting the gradation values of the first color and the second color are designated following the command header. FIG. 4F illustrates an example of a brush pattern set command for defining a brush pattern. Various parameters including K width and Y width of the brush pattern, and the head address of the brush pattern are designated following the command header. The head address of the brush pattern is a head address at which the brush pattern is stored in a brush pattern storage unit 204 which will be described later relating to FIG. 8 and FIG. 9.

Figure 4G:
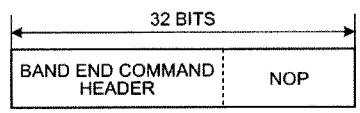

FIG. 4G illustrates an example of a band end command for instructing a termination of the defined band drawing. This band end command has the command header only.

FIG. 5 illustrates an example of the intermediate language processed by the drawing unit at the step S13. In this example, a command group 30 of the drawing commands based on the intermediate language are generated for each of C, M, Y, and K color version. In the example of FIG. 5, as for C color version (hereinafter C version), a C version band initialization command, a C version threshold value table set command, a C version drawing gradation value definition command, a C version square drawing command, a C version triangle drawing command, a C version drawing gradation definition command, a C version square drawing command, and a C version band end command are sequentially described. Also for M color version (M version), Y color version (Y version), and K color version (K version), commands are similarly described according to the content of the drawing.

In the command group 30, a brush pattern set command 31 can be used as a common command for C, M, Y, and K versions. Without limitation to this, the brush pattern set command 31 may be set for each of C, M, Y, and K versions.

Figure 6:
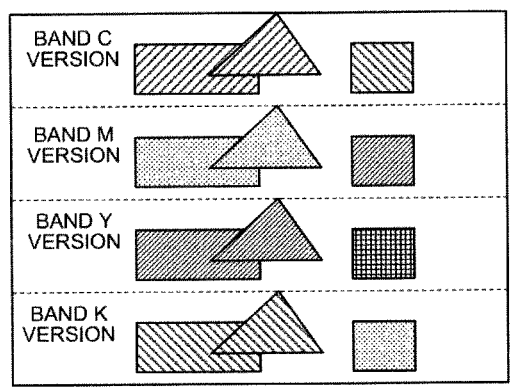
FIG. 6 is a diagram illustrating examples of each color component image drawn according to commands by means of intermediate language and written in the band storage area.

FIG. 6 illustrates examples of each color versions of images drawn on the basis of the command group 30 in FIG. 5 and written in the band storage area. In the command group 30, for each of C, M, Y, and K versions, a square and a triangle are drawn after the gradation values of the first color and the second color are designated by the first drawing gradation value definition command. Then, another square is drawn after the gradation values of the first color and the second color are designated by the second drawing gradation value definition command. These squares and triangle are drawn by applying the brush defined by the brush definition command 31 to the gradation values of the first color and the second color.

Detail Explanation of Brush Treatment According to the Embodiment

Figure 7:
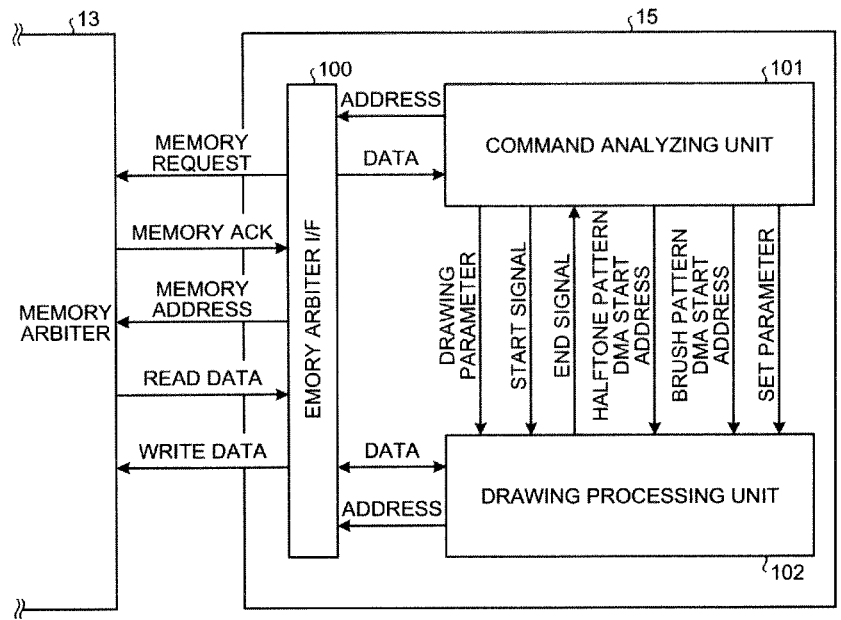
FIG. 7 is a block diagram illustrating an exemplary configuration of the drawing unit according to the embodiment.

Next, the brush treatment according to the embodiment is explained in more detail. FIG. 7 illustrates an exemplary configuration of the drawing unit 15 in FIG. 1. In FIG. 7, common units or parts with units or parts in FIG. 1 carry the same reference numerals. The redundant explanation is omitted. As illustrated in FIG. 7, the drawing unit 15 includes a memory arbiter I/F 100, a command analyzing unit 101, and a drawing processing unit 102. The memory arbiter I/F 100 is an interface between the command analyzing unit 101/the drawing processing unit 102 and the memory arbiter 13.

The command analyzing unit 101 transfers a reading address information to the memory arbiter 13 via the memory arbiter I/F 100, and reads the drawing command from the drawing command storage area of the main memory 14. If it is determined that the read drawing command is a command to designate the drawing parameter as a result of the analysis of the read drawing command, the command analyzing unit 101 transfers the designated drawing parameter value to the drawing processing unit 102. If it is determined that the read drawing command is a command to designate the parameter setting, the command analyzing unit 101 transfers the setting parameter value to the drawing processing unit 102.

The drawing processing unit 102 receives the drawing parameter value from the command analyzing unit 101, and performs the drawing processing according to the received drawing parameter value. The image data generated by the drawing processing is transferred to the memory arbiter 13 via the memory arbiter I/F 100 with the address information indicating a writing address to the main memory 14, so that the image data is written in the main memory 14. The drawing processing unit 102 receives the setting parameter value from the command analyzing unit 101, and sets the received setting parameter value to a predetermined value.

The command analyzing unit 101 sends a start signal to indicate the processing start to the drawing processing unit 102. The drawing processing unit 102 starts the drawing processing on the basis of the start signal sent from the command analyzing unit 101. When the drawing processing is completed, the drawing processing unit 102 sends an end signal to the command analyzing unit 101 to inform the end of the drawing processing.

Figure 8:
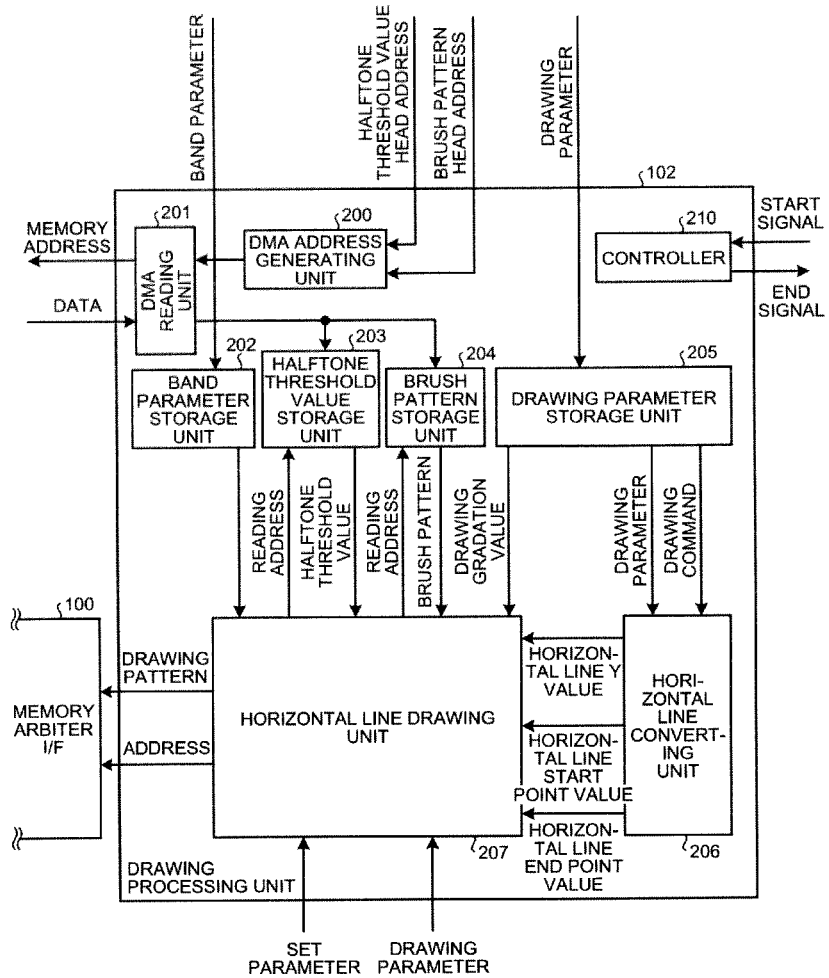
FIG. 8 is a block diagram illustrating an exemplary configuration of the drawing processing unit according to the embodiment.

FIG. 8 illustrates an exemplary configuration of the drawing processing unit 102. In FIG. 8, common units or parts with units or parts in FIG. 7 carry the same reference numerals. The redundant explanation is omitted. A DMA address generating unit 200 receives a halftone threshold value head address and a brush pattern head address as setting parameters from the command analyzing unit 101. Then, the DMA address generating unit 200 generates a DMA address from the received head addresses, and transfers it to a DMA reading unit 201.

According to the DMA address received from the DMA address generating unit 200, the DMA reading unit 201 reads a halftone threshold value matrix and a brush pattern data from the main memory 14 via the memory arbiter I/F 100. The read halftone threshold value matrix is stored as a halftone threshold value table in the halftone threshold value storage unit 203. The read brush pattern is stored in the brush pattern storage unit 204.

In the present embodiment, an access unit of the halftone threshold value storage unit 203 and the brush pattern storage unit 204 respectively is 32 bits. One pixel has a bit depth of 8 bits. A processing unit of the drawing data is 128 bits.

Figure 9:
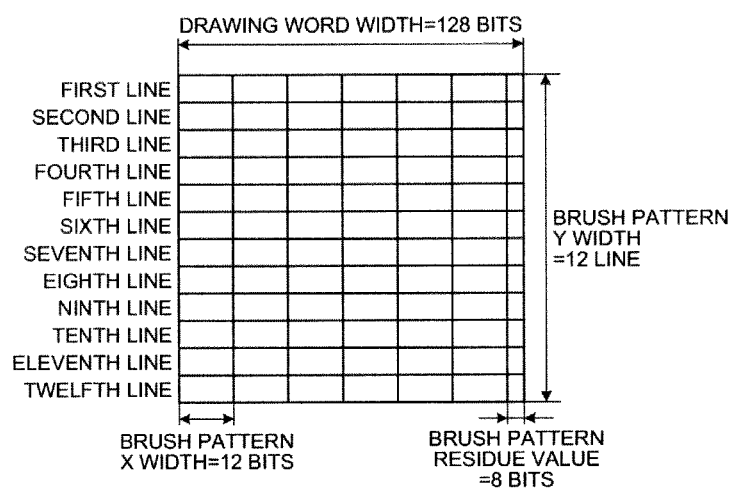
FIG. 9 is a diagram illustrating an exemplary format of a brush pattern storage unit according to the embodiment.

FIG. 9 illustrates an exemplary format of the brush pattern storage unit 204. The brush pattern is made of "p (pixels)×q (lines)" matrix having p pixels in X direction (i.e. direction along the horizontal line) and q lines in Y direction (i.e. direction vertical to the horizontal line). Each pixel is a binary data having either "0" or "1". For example, the first color may be associated with "1", and the second color may be associated with "0", so that a brush treatment is performed by selecting the first color or the second color for each pixel according to the brush pattern. The horizontal direction width of the brush pattern is referred to as the brush pattern X width. The vertical direction width of the brush pattern is referred to as the brush pattern Y width.

The brush pattern is repeatedly expanded and written in X direction in the memory space of the brush pattern storage unit 204 corresponding to the drawing word width. In this example, the drawing word width is 128 bits and the brush pattern X width is 12 bits. Therefore, when the brush pattern is repeatedly written in X direction, a residue part of 8 bits is arisen at the end of X direction. The information indicating this residue part of 8 bits is stored as the brush pattern residue value in the brush pattern storage unit 204.

In Y direction, the brush pattern is written equally to the brush pattern Y width in the brush pattern storage unit 204. In the example of FIG. 9, the brush pattern Y width is 12 bits (12 lines). The brush pattern X width and Y width can be designated by the user on a personal computer for generating the PDL data, for example.

Referring back to FIG. 8, on the other hand, if the band initialization command is obtained from the analysis result of the drawing command by the command analyzing unit 101, various band parameters including the band initialization address, the band height, and the band width are stored in the band parameter storage unit 202. If the command to indicate the drawing (e.g. the square drawing command or the triangle drawing command) is obtained from the analysis result of the drawing command by the command analyzing unit 101, the drawing parameter included in the drawing command is stored in the drawing parameter storage unit 205.

If the threshold value definition command is obtained from the analysis result of the drawing command by the command analyzing unit 101, the halftone pattern X width and Y width, and the halftone threshold value head address are transferred as the setting parameters to the horizontal line drawing unit 207. Similarly, if the brush pattern set command is obtained from the analysis result of the drawing command by the command analyzing unit 101, the brush pattern X value and Y value, and the brush pattern head address are transferred as the setting parameters to the horizontal line drawing unit 207.

The horizontal line converting unit 206 reads the drawing parameter from the drawing parameter storage unit 205, converts the read drawing parameter into various horizontal line data including the horizontal line Y value, the horizontal line start point value and the horizontal line end point value, and transfers them to the horizontal line drawing unit 207. The horizontal line drawing unit 207 reads the band parameter from the band parameter storage unit 202. According to various horizontal line data transferred from the horizontal line converting unit 206 and the band parameter read from the band parameter storage unit 202, the horizontal line drawing unit 207 performs the drawing processing of the horizontal line for the band storage area of the main memory 14 via the memory arbiter I/F 100.

According to the halftone reading address generated at the halftone threshold value address generating unit 314 which will be described later with reference to FIG. 12, the horizontal line drawing unit 207 reads the halftone threshold value matrix from the halftone threshold value storage unit 203. According to the brush pattern reading address generated at the brush pattern address generating unit 317 which will be described later with reference to FIG. 12, the horizontal line drawing unit 207 reads the brush pattern from the brush pattern storage unit 204. According to these halftone threshold value address and brush pattern address read as such, the brush treatment is performed for the image data to be drawn.

The controller 210 has a ROM or microprocessor for example, and controls the drawing processing unit 102 according to the program preinstalled or prestored in the ROM. For example, the controller 210 makes the drawing processing unit 102 start the drawing processing by the start signal sent from the command analyzing unit 101. When the drawing is finished, the controller 210 sends the end signal to the command analyzing unit 101.

Figure 10:
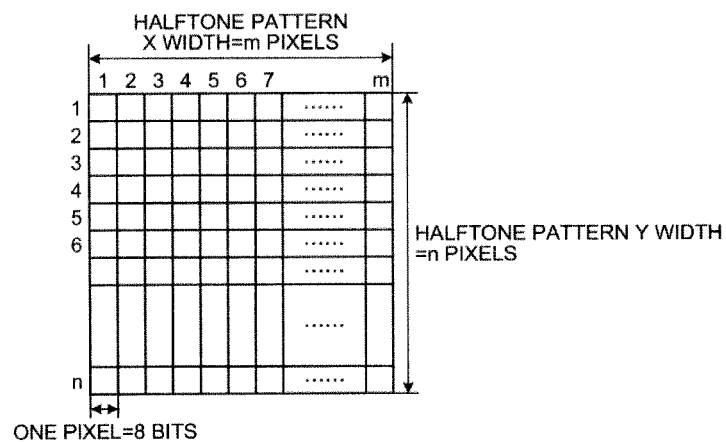
FIG. 10 is a diagram illustrating an exemplary configuration of a halftone threshold value table stored in a halftone threshold storage unit.

FIG. 10 illustrates an exemplary configuration of the halftone threshold value table to be stored in the halftone threshold value storage unit 203. The halftone threshold value table is made of "m(pixels)×n(pixels)" having m pixels in the horizontal direction (X direction) and n pixels (n lines) in the vertical direction (Y direction). A threshold value is set for each position of the matrix. Each pixel of threshold value matrix has a bit depth of 8 bits. The threshold value is compared to the pixel value of the image data. On the basis of the comparison result, the image data is binarized. Through this binarization, the halftone pattern is formed with having a density corresponding to the distribution of the threshold values in the matrix. The horizontal direction width of the halftone threshold value table is referred to as the halftone pattern X width, and the vertical direction width of the halftone threshold value table is referred to as the halftone pattern Y width.

Figure 11:
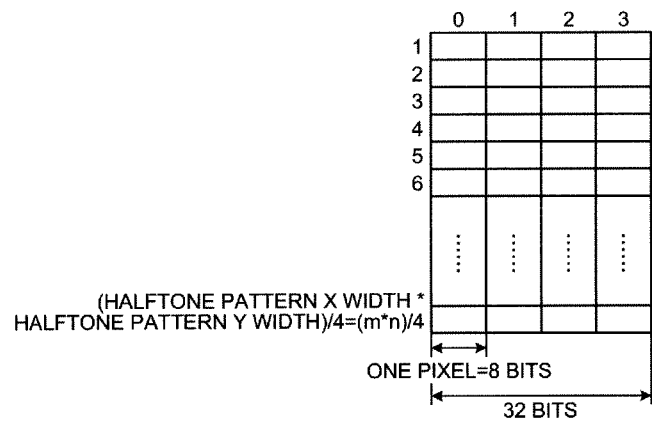
FIG. 11 is a diagram illustrating an exemplary format of the halftone storage unit.

FIG. 11 illustrates an exemplary format of the halftone threshold value storage unit 203. As mentioned above, in the present embodiment, an access unit of the halftone threshold value storage unit 203 is 32 bits. For example, each value in the halftone threshold value table is sequentially filled from left to right in FIG. 11 and it is repeated from top to bottom in FIG. 11 in the halftone threshold value storage unit 203. Therefore, the end position of the halftone threshold value table is included in a line indicated by an integer portion of a quotient of the division: (halftone pattern X width×halftone pattern Y width)/4=(m×n)/4.

Figure 12:
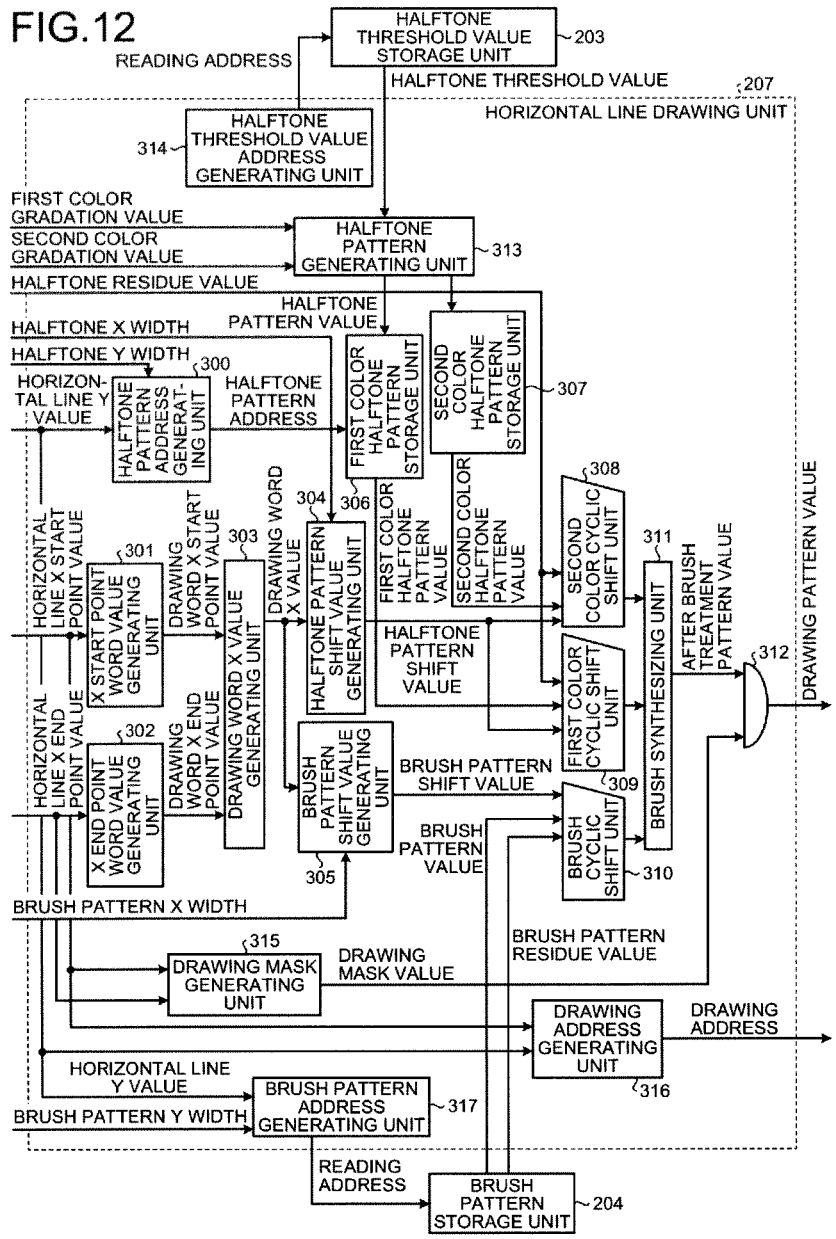
FIG. 12 is a block diagram illustrating an exemplary configuration of a horizontal drawing unit according to the embodiment.

FIG. 12 illustrates an exemplary configuration of the horizontal drawing unit 207. In FIG. 12, units or parts common with units or parts in FIG. 8 carry the same reference numerals and the redundant explanation is omitted.

The halftone pattern address generating unit 300 obtains the halftone pattern Y value by performing a calculation (horizontal line Y value MOD halftone pattern Y width) from the horizontal line Y value and the halftone pattern Y width.

Incidentally, "MOD" is an operator for obtaining a residue. The halftone pattern address generating unit 300 transfers this halftone pattern Y value as a halftone pattern address to the first color halftone pattern storage unit 306 and the second color halftone pattern storage unit 307, respectively.

The first color halftone pattern storage unit 306 and the second color halftone pattern storage unit 307 store the halftone pattern Y width of the horizontal line having the drawing word width (128 bits in the present embodiment) of the first and second halftone pattern values, respectively. According to the halftone pattern address transferred from the halftone pattern address generating unit 300, the first color halftone pattern value for which an access is made to the first color halftone pattern storage unit 306 is transferred to the first color cyclic shift unit 309. Similarly, according to the halftone pattern address, the second color halftone pattern value for which an access is made to the second halftone pattern storage unit 307 is transferred to the second color cyclic shift unit 308.

As described above, in the present embodiment, an access unit of the halftone threshold value storage unit 203 is 32 bits. On the other hand, the horizontal line drawing unit 207 is processed by a unit of drawing word, that is, a unit of 128 bits in the present embodiment. The format of the first color halftone pattern storage unit 306 and the format of the second color halftone pattern storage unit 307 conform with the access of the drawing word unit.

Therefore, in the halftone pattern generating unit 313, the first color halftone pattern and the second color halftone pattern, which are obtained by the halftone pattern generating process performed in accordance with the halftone pattern threshold value table transferred from the halftone threshold value storage unit 203, are converted into a drawing word unit format, and transferred to the first color halftone pattern storage unit 306 and the second color halftone pattern storage unit 307.

Figure 13:
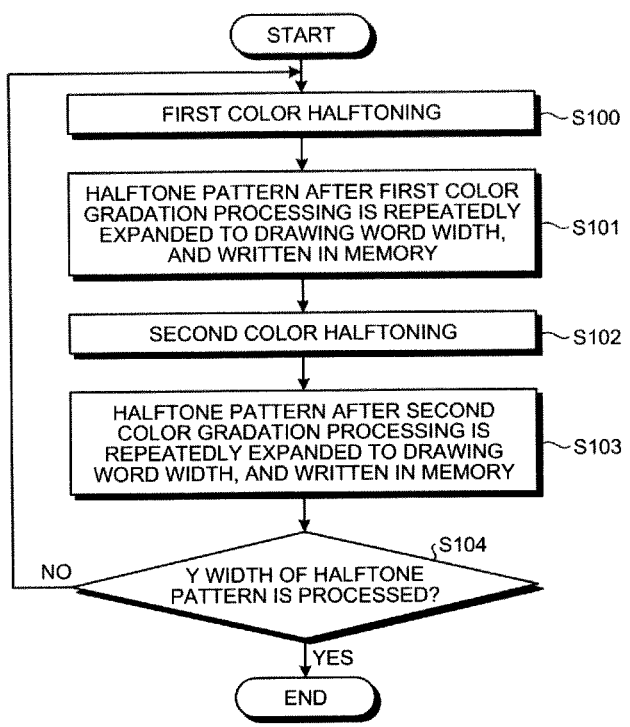
FIG. 13 is a flow chart illustrating an exemplary operation of a halftone pattern generation processing unit.

FIG. 13 illustrates an exemplary flow chart of a process by the halftone pattern generating unit 313. At step S100, the halftone pattern generating unit 313 performs the first color halftoning. Specifically, the halftone pattern generating unit 313 cuts and reads the halftone threshold value of pixel having the halftone pattern X width (s-th line in the halftone threshold value table) from the halftone threshold value storage unit 203. The read halftone threshold value is compared with the first color gradation value, so that the gradation processing is performed. From this gradation processing, the first color data after gradation processing having the halftone pattern X width is generated.

At the next step S101, the halftone pattern generating unit 313 repeatedly expands the first color data after gradation processing having the halftone pattern X width obtained at the step S100 to the drawing word width, and sequentially writes them in the first color halftone pattern storage unit 306.

The process is shifted to the step S102. The halftone pattern generating unit 313 performs the second color halftoning. Specifically, the halftone pattern generating unit 313 cuts and reads the halftone threshold value of pixel having the halftone pattern X width (n-th line in the halftone threshold value table) from the halftone threshold value storage unit 203. The read halftone threshold value is compared with the second color gradation value, so that the gradation processing is performed. From this gradation processing, the second color data after gradation processing having the halftone pattern X width is generated.

At the next step S103, the halftone pattern generating unit 313 repeatedly expands the second color data after gradation processing having the halftone pattern X width obtained at the step S102 to the drawing word width, and sequentially writes them in the second color halftone pattern storage unit 307. From step S100 to step S103, one line of the halftone pattern is processed.

Then, at the next step S104, the halftone pattern generating unit 313 judges whether the processing of the halftone pattern is finished for all halftone pattern Y width. If it is judged that the processing is not finished for all Y width, the process is back to the step S100, so that the process from the step S100 to the step S103 is performed for the next line of the halftone pattern, that is, (s+1)-th line in the halftone threshold value table. On the ocher hand, if it is judged that the processing is finished for all Y width, a series of halftone pattern generating process is terminated.

Figure 14:
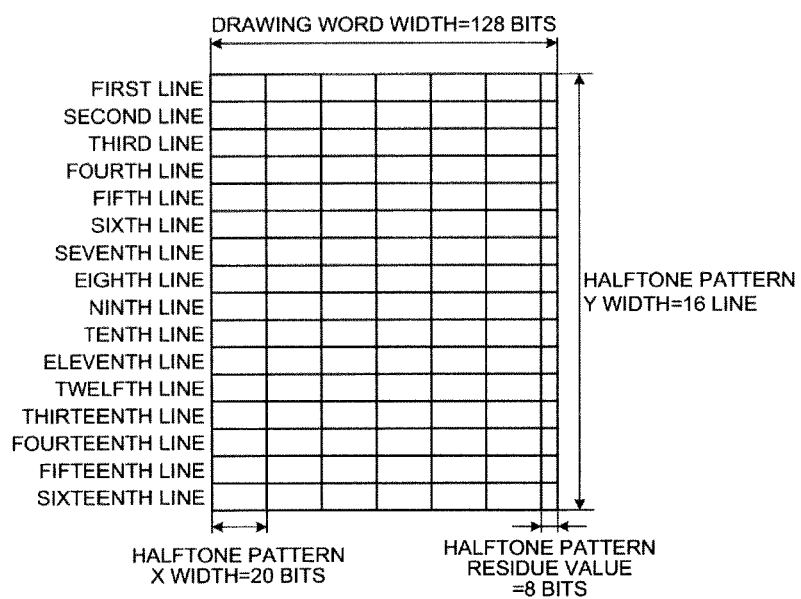
FIG. 14 is a diagram illustrating an exemplary format of a first color halftone pattern storage unit according to the embodiment.

FIG. 14 illustrates an exemplary format of the first color halftone pattern storage unit 306 in which the halftone threshold value is written by the processing of FIG. 13. Incidentally, the format of the second color halftone pattern storage unit 307 is the same as the format of the first color halftone pattern storage unit 306. Therefore, the redundant explanation is omitted.

For the memory space having a drawing word width as the X direction width thereof, the halftone threshold value table is repeatedly expanded in X direction and written. In this example, the drawing word width is 128 bits and the halftone pattern X width is 20 bits. Therefore, when the halftone threshold value table is repeatedly written in X direction, a residue of 8 bits is arisen at the end of the X direction. This residue of 8 bits is stored as the halftone pattern residue value in the first color halftone pattern storage unit 306.

In Y direction, for the first color halftone pattern storage unit 306, the halftone threshold value table is written equally to the halftone pattern Y width. In the example of FIG. 14, the halftone pattern Y width is 16 lines.

Referring back to FIG. 12, the X start point word value generating unit 301 obtains the drawing word X start point value based on the drawing word unit from the horizontal line X start point value transferred from the horizontal converting unit 206, and transfers it to the drawing word X value generating unit 303. The X end point word value generating unit 302 obtains the drawing word X end point value based on the drawing word unit from the horizontal line X end point value from the horizontal line converting unit 206, and transfers it to the drawing word X value generating unit 303.

The drawing unit X value generating unit 303 generates the drawing word X value from the X start point value to the X end point value based on the drawing word unit, which are transferred respectively from the X start point word value generating unit 301 and the X end point word value generating unit 302, and transfers the generated drawing word X value to the halftone pattern shift value generating unit 304 and the brush pattern shift value generating unit 305, respectively.

From the drawing word X value transferred from the drawing word X value generating unit 303, and the halftone pattern X width, the halftone pattern shift value generating unit 304 performs a calculation (drawing word X value MOD halftone pattern X width), so that the halftone pattern X value is obtained. The halftone pattern X value is transferred as the halftone pattern shift value to the first color cyclic shift unit 309 and the second color cyclic shift unit 308, respectively.

The first color cyclic shift unit 309 receives the first color halftone pattern value, the halftone pattern shift value, and the halftone pattern residue value from the first color halftone pattern storage unit 306, the halftone pattern shift value generating unit 304, and the drawing parameter storage unit 205, respectively. On the basis of received values and the drawing word width, the first color cyclic shift unit 309 cyclically shifts the first color halftone pattern value, and inputs the halftone pattern value after cyclic shift to the first input terminal of the brush synthesizing unit 311.

Similarly, the second color cyclic shift unit 308 receives the second color halftone pattern value, the halftone pattern shift value, and the halftone pattern residue value from the second color halftone pattern storage unit 307, the halftone pattern shift value generating unit 304, and the drawing parameter storage unit 205, respectively. On the basis of received values and the drawing word width, the second color cyclic shift unit 308 cyclically shifts the second color halftone pattern value, and inputs the halftone pattern value after cyclic shift to the second input terminal of the brush synthesizing unit 311.

From the brush pattern X value received as the setting parameter from the command analyzing unit 101, and the drawing word value transferred from the drawing word X value generating unit 303, the brush pattern shift value generating unit 305 performs a calculation (drawing word X value MOD brush pattern X width), so that the brush pattern X value is obtained. The brush pattern X value is transferred as the brush pattern shift value to the brush cyclic shift unit 310.

From the brush pattern Y width received as the setting parameter from the command analyzing unit 101 and the horizontal line Y value transferred from the horizontal line converting unit 206, the brush pattern address generating unit 317 performs a calculation (horizontal line Y value MOD brush pattern Y width), so that the brush pattern Y value is obtained. The brush pattern Y value is transferred as the brush pattern address to the brush pattern storage unit 204. At the brush pattern storage unit 204, the brush pattern value is read according to the brush pattern address, and transferred to the brush cyclic shift unit 310.

The brush cyclic shift unit 310 receives the brush pattern shift value from the brush pattern shift value generating unit 305. Also the brush cyclic shift unit 310 receives the brush pattern value and the brush pattern residue value from the brush pattern storage unit 204, respectively. On the basis of the received values and the drawing word width, the brush cyclic shift unit 310 cyclically shifts the brush pattern value, and inputs the brush pattern value after cyclic shift to the third input terminal of the brush synthesizing unit 311. The brush pattern value is binary data which may be for example "0" or "1".

According to the brush pattern value after cyclic shift transferred from the brush cyclic shift unit 310, the brush synthesizing unit 311 selects which one of the first color halftone value after cyclic shift and the second color halftone value after cyclic shift should be output for each pixel. Thereby, the first color halftone value and the second color halftone value are synthesized according to the brush pattern. The halftone pattern value after synthesizing is transferred to the first input terminal of the logic operation unit 312.

From the horizontal line X start point value and the horizontal line X end point value received from the horizontal line converting unit 206, the drawing mask generating unit 315 generates a drawing mask from the X start point to the X end point for each drawing word, and inputs the drawing mask value to the second input terminal of the logic operation unit 312.

The logic operation unit 312 performs a logical AND operation for inputs from the first and second input terminals. Specifically, the logic operation unit 312 generates the drawing pattern value by carrying out the logical AND operation for the halftone pattern value after synthesizing received from the brush synthesizing unit 311 and the drawing mask value received from the drawing mask generating unit 315. The drawing pattern value is transferred to the memory arbiter I/F 100.

From the horizontal line Y value and the horizontal line X start point value received from the horizontal line converting unit 206, the drawing address generating unit 316 generates the drawing address which is an address for performing the drawing to the band storage area of the main memory 14. The generated drawing address is transferred to the memory arbiter I/F 100.

Figure 15:
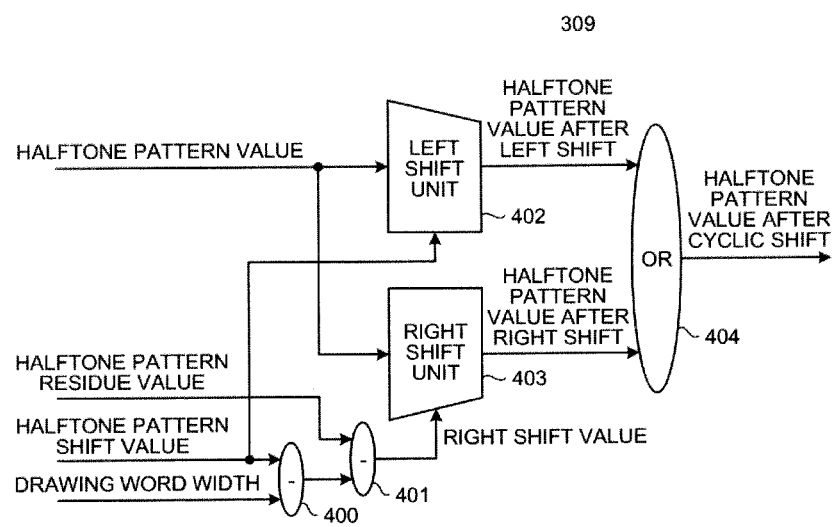
FIG. 15 is a block diagram illustrating an exemplary configuration of a first color cyclic shift unit according to the embodiment.

FIG. 15 illustrates an exemplary configuration of the first color cyclic shift unit 309. Incidentally, the second color cyclic shift unit 308 and the brush cyclic shift unit 310 have the same configuration of the first color cyclic shift unit 309. Therefore, the redundant explanation will be omitted.

The first color cyclic shift unit 309 includes subtractors 400, 401, a left shift unit 402, a right shift unit 403, and a logic operation unit 404. The logic operation unit 404 performs a logical OR operation (logical sum operation (for the input values from the first and second input terminals. Each of subtractors 400, 401 subtracts the input value of the second input terminal from the input value of the first input terminal.

Hereinafter, the explanation is made on an example in which the drawing word width is 128 bits, the first color halftone pattern X value is 20 bits, the first color halftone pattern residue value is 8 bits, and the first color halftone pattern shift value is 10 bits.

The first color halftone pattern value having the drawing word width transferred from the first color halftone pattern storage unit 306 is input to the left shift unit 402 and the right shift unit 403, respectively. The first color halftone pattern value which is input to the left shift unit 402 is subjected to the left shift (10 bits of left shift in this example) according to the halftone pattern shift value transferred from the halftone pattern shift value generating unit 304. In the first color halftone pattern value after the left shift, each bit value is replaced by "0" from the right end bit after the left shift to a bit position corresponding to the halftone pattern shift value (10 bits) therefrom.

At the subtractor 400, the drawing word width value is input to the first input terminal, and the first color halftone pattern shift value is input to the second input terminal. The subtractor 400 subtracts the halftone pattern shift value from the drawing word width value, and inputs the obtained value (118 bits in this example) to the first input terminal of the subtractor 401. To the second input terminal of the subtractor 401, the first color halftone pattern residue value (8 bits in this example) is input which is transferred from the first color halftone pattern storage unit 306.

The subtractor 401 subtracts the first color halftone residue value from the output of the subtractor 400, and inputs the obtained value (110 bits in this example) to the right shift unit 403. Thereby, at the right shift unit 403, the first halftone pattern value is subjected to the right shift (110 bits of right shift in this example) according to the output of the subtractor 401. In the first color halftone pattern value after the right shift, each bit value is replaced by "0" from the right end bit after the right shift to a bit position corresponding to the right shift (110 bits) therefrom.

The output of the left shift unit 402 and the output of the right shift unit 403 are input to the first and second input terminals of the logic operation unit 404, respectively. The logic operation unit 404 performs a logical OR operation for the outputs of the left shift unit 402 and the right shift unit 403. The drawing word width value obtained from the logical OR operation is output as the first color halftone pattern value.

The same processing as mentioned above is performed also at the second color cyclic shift unit 308 and the brush cyclic shift unit 310. Also with the output of the first cyclic shift unit 309, the outputs of the second cyclic shift unit 308 and the brush cyclic shift unit 310 are input to the brush synthesizing unit 311, respectively.

Figure 16:
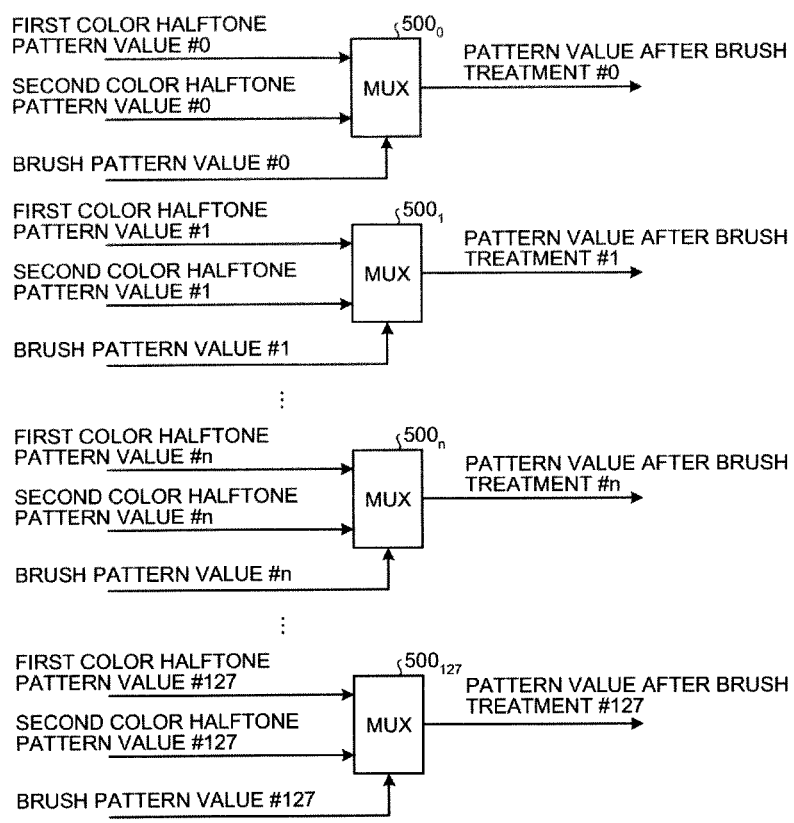
FIG. 16 is a block diagram illustrating an exemplary configuration of a brush synthetic unit according to the embodiment.

FIG. 16 illustrates an exemplary configuration of the brush synthesizing unit 311. The brush synthesizing unit 311 has multiplexers (MUX) $500_0, 500_1, \ldots, 500_n, \ldots, 500_{127}$ to select which one of the first color halftone pattern value #n and the second color halftone pattern value #n should be output for each bit having the drawing word width according to the brush pattern value #n. Each output of each multiplexer $500_0, 500_1, \ldots, 500_n, \ldots, 500_{127}$ is output as each pattern value after brush treatment #0, #1, , , #n , , , #127 having the drawing word width.

Figure 17:
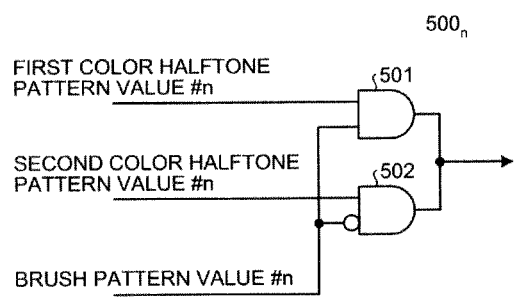
FIG. 17 is a diagram illustrating an operation of a multiplexer in the brush synthetic unit according to the embodiment.

With reference to FIG. 17, an operation of the multiplexer $500_n$ is explained. Herein, when the brush pattern value #n is "1", the first color halftone pattern value #n is selected, and when the brush pattern value #n is "0", the second color halftone pattern value #n is selected. In an AND circuit 501, a logical AND of the first color halftone pattern value #n and the brush pattern value #n is obtained. In an AND circuit 502, a logical AND of the second color halftone pattern value #n and a reversal value of the brush pattern value #n is obtained. Thereby, when the brush pattern value #n is "1", the first color halftone pattern value #n is selected. When the brush pattern value In is "0", the second color halftone pattern value #n is selected. The output from the AND circuits 501, 502 is output as the pattern value #n after brush treatment from the multiplexer $500_n$.

FIG. 18 illustrates examples of each pattern before and after the cyclic shift processing and the brush synthesizing processing. In FIG. 18A to FIG. 18G, a white circle (○) indicates a bit whose value is "0", and a black circle (●) or a shaded circle indicates a bit whose value is "1". From the right side to the left side in each of FIG. 18A to 18G, bits are arranged from LSB (Least Significant Bit) to MSB (Most Significant Bit) in each pattern.

Figure 18A:
FIGS. 18A to 18G illustrate examples of patterns before and after the cyclic shift processing and the brush synthetic processing.

FIG. 18A and FIG. 188 illustrate each example of the first color halftone pattern value and the second color halftone pattern value which are read from the first color halftone pattern storage unit 306 and the second color halftone pattern storage unit 307, respectively. FIG. 18C illustrates an example of the brush pattern value which is read from the brush pattern storage unit 204. In the brush pattern value, the first color halftone pattern value is selected at the bit position represented by the black circle (●) whose value is "1", and the second color halftone pattern value is selected at the bit position represented by the white circle (○) whose value is "0".

Figure 18B:
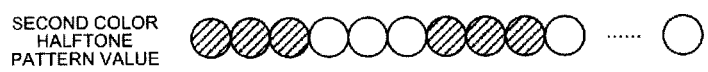
Figure 18C:
Figure 18D:
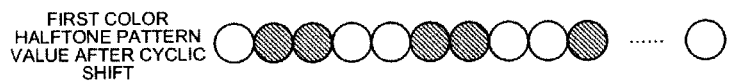
Figure 18E:
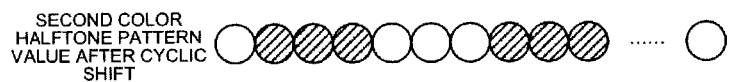
Figure 18F:

FIG. 18D to FIG. 18F illustrate each example of each pattern of FIG. 18A to 18C after subjected to the cyclic shift by the first color cyclic shift unit 309, the second color cyclic shift unit 308, and the brush cyclic shift unit 310, respectively. Herein, each pattern is shifted to the right side by one bit from the state illustrated in each of FIG. 18A to FIG. 18C.

Figure 18G:

FIG. 18G illustrates the pattern value after brush treatment which is obtained by synthesizing each pattern illustrated in FIG. 18D to FIG. 18F at the brush synthesizing unit 311. Thus, the first color halftone pattern value after cyclic shift illustrated in FIG. 18D is selected at the bit position represented by the value "1" (black circle ●) in the brush pattern value after cyclic shift, and the second color halftone pattern value after cyclic shift illustrated in FIG. 18E is selected at the bit position represented by the value "0" (white circle ○) in the brush pattern value after cyclic shift. Thus, the first color halftone pattern value, the second color halftone pattern value, and the brush pattern value are synthesized.

Figure 19:
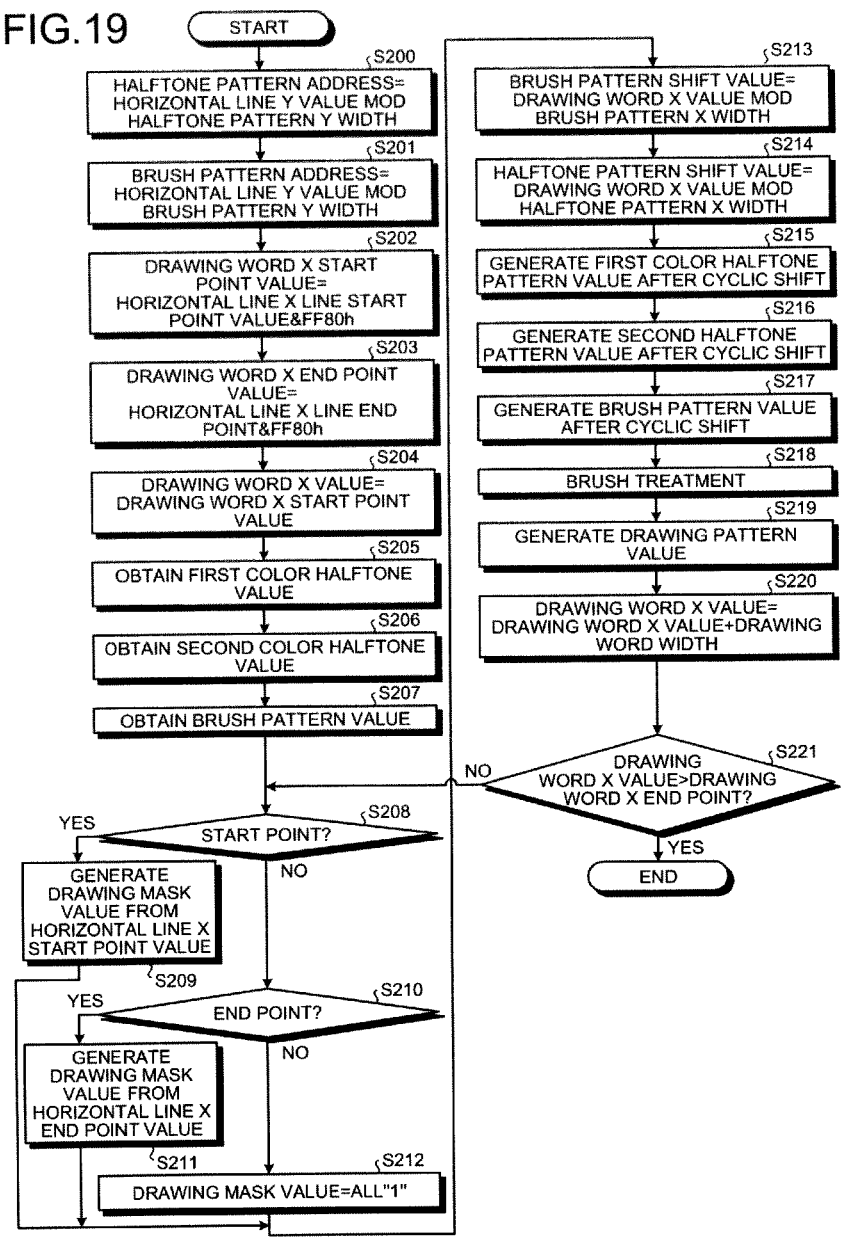
FIG. 19 is a flow chart illustrating an exemplary operation of the horizontal line drawing unit according to the embodiment.

FIG. 19 is a flow chart illustrating an exemplary operation of the horizontal line drawing unit 207 in the present embodiment. At step S200 and step S201, the halftone pattern address and the brush pattern address are calculated by the halftone pattern address generating unit 300 and the brush pattern address generating unit 317.

Specifically, at step S200, the halftone pattern address generating unit 300 calculates the halftone pattern address by performing a calculation (horizontal line Y value MOD halftone pattern Y width) from the horizontal line Y value transferred from the horizontal line converting unit 206 and the halftone pattern Y width obtained through the analysis of the drawing command by the command analyzing unit 101. At step S201, the brush pattern address generating unit 317 calculates the brush pattern address by performing a calculation (horizontal line Y value MOD brush pattern Y width) from the horizontal line Y value, the brush pattern Y width obtained through the analysis of the drawing command by the command analyzing unit 101.

Next, at step S202 and step S203, the drawing word X start point value and the drawing word X end point value are calculated by the X start point word value generating unit 301 and the X end point word value generating unit 302, respectively.

Specifically, at step S202, the X start point word value generating unit 301 obtains the drawing word X start point value which is a 128 bit unit value by performing an AND operation from the horizontal line X value transferred from the horizontal line converting unit 206 and FF80h which is a 16 bit pattern ("h" means that the last character string is given in hexadecimal). Similarly, the X end point word value generating unit 302 obtains the drawing word X end point value which is a 128 bit unit value by performing an AND operation from the horizontal line X value transferred from the horizontal line converting unit 206 and FF80h which is a 16 bit pattern.

Incidentally, the order or sequence from step S200 to step S203 is an example, and not exclusive. The processing from step S200 to step S203 may be performed in a parallel way.

At the next step S204, the drawing word X value generating unit 303 sets the drawing word X start point value generated by the X start point word value generating unit 301 as the drawing word X value.

Next, at step S205 and step S206, the first color halftone pattern value and the second color halftone pattern value are obtained. Specifically, at step S205, according to the halftone pattern address generated by the halftone pattern address generating unit 300, an access is made on the first color halftone pattern storage unit 306, so that the first halftone pattern value is obtained. Similarly, at step S206, according to the halftone pattern address, an access is made on the second color halftone pattern storage unit 307, so that the second color halftone pattern value is obtained. Next, at step S207, according to the reading address generated by the brush pattern address generating unit 317, an access is made on the brush pattern storage unit 204, so that the brush pattern value is obtained.

The order or sequence from step S205 to step S207 is an example, and not exclusive. The processing from step S205 to step S207 may be performed in a parallel way.

At the next step S208, the drawing mask generating unit 315 judges whether or not the drawing word X value generated at step S204 is a start point. If it is judged as the start point, the drawing mask generating unit 315 shifts the process to step S209 in which the drawing mask is generated from the horizontal line X start point value. Then, the process is shifted to step S213.

On the other hand, at step S208, if it is not judged as the start point, the drawing mask generating unit 315 shifts the process to step S210 in which it is judged whether or not the drawing word X value generated at step S204 is an end point. If it is judged as the end point, the drawing mask generating unit 315 shift the process to step S211 in which the drawing mask is generated from the horizontal line X end point value. Then, the process is shifted to step S213.

On the other hand, at step S210, if it is not judged as the end point, the drawing mask generating unit 315 shifts the process to step S212 in which it is determined that there is no mask. For example, the drawing mask generating unit 315 brings no mask status by setting all bits to "1" in the drawing mask value.

Next, at step S213, the brush pattern shift value generating unit 305 obtains the brush pattern shift value by performing a calculation (drawing word X value MOD brush pattern X width) from the drawing word X value generated by the drawing word X value generating unit 303 at step S204 and the brush pattern X width obtained through the analysis of the drawing command by the command analyzing unit 101.

Next, at step S214, the halftone pattern shift value generating unit 304 obtains the halftone pattern shift value by performing a calculation (drawing word X value MOD halftone pattern X width) from the drawing word X value generated by the drawing word X value generating unit 303 at step S204 and the halftone pattern X width obtained through the analysis of the drawing command by the command analyzing unit 101.

Incidentally, the order or sequence from step S208 to step S214 is an example, and not exclusive. The processing from step S208 to step S214 may be performed in a parallel way.

Next, at step S215, step S216, and step S217, the first color halftone pattern value after cyclic shift, the second color halftone pattern value after cyclic shift, and the brush pattern value after cyclic shift are generated by the first color cyclic shift unit 309, the second color cyclic shift unit 308, and the brush cyclic shift unit 310, respectively.

Specifically, at step S215, the first color cyclic shift unit 309 cyclically shifts the first color halftone pattern value read from the first color halftone pattern storage unit 306 according to the halftone pattern address generated by the halftone pattern address generating unit 300 at step S200, on the basis of the halftone pattern residue value, the halftone pattern shift value generated by the halftone pattern shift value generating unit 304 at step S214, and the drawing word value. The first color halftone pattern value subjected to the cyclic shift is output as the first color halftone pattern value after cyclic shift from the first color cyclic shift unit 309.

Similarly, at step S216, the second color cyclic shift unit 308 cyclically shifts the second halftone pattern value read from the second color halftone pattern storage unit 307 according to the halftone pattern address, on the basis of the halftone pattern residue value, the halftone pattern shift value, and the drawing word value. The second color halftone pattern value subjected to the cyclic shift is output as the second color halftone pattern value after cyclic shift from the second color cyclic shift unit 308.

At step S217, the brush cyclic shift unit 310 cyclically shifts the brush pattern value read from the brush pattern storage unit 204 according to the brush pattern address generated by the brush pattern address generating unit 317 at step S201, on the basis of the brush pattern residue value, the brush pattern shift value generated by the brush pattern shift value generating unit 305 at step S213, and the drawing word value. The brush pattern value subjected to the cyclic shift is output as the brush pattern value after cyclic shift from the brush cyclic shift unit 310.

The order or sequence from step S215 to step S217 is an example, and not exclusive. The processing from step S215 to step S217 may be performed in a parallel way.

The process is shifted to step S218. The brush synthesizing unit 311 performs a brush treatment on the basis of the first color halftone pattern value, the second color halftone pattern value and the brush pattern value which are generated at steps from S215 to S217. Specifically, as mentioned above, either the first color halftone value or the second color halftone pattern value is selected according to the brush pattern value, so that the brush pattern is synthesized with the first color halftone pattern value and the second color halftone pattern value.

Next, at step S219, the logic operation unit 312 generates the drawing pattern value by performing an AND operation from the pattern after brush treatment obtained through the brush treatment at step S218 and the drawing mask value obtained through processing at step S208 to step S212.

Next, at step S220, the drawing word X value generating unit 303 adds the drawing word width to the drawing word X value, so that the next drawing word X value is generated. Then, at the next step S221, the drawing word X value generating unit 303 judges whether or not the drawing word X value generated at step S220 exceeds the drawing word X end point value. If it is not judged as exceeded, the process is back to step S208 to continue the drawing processing of the horizontal line. If it is judged as exceeded, a series of drawing processing is terminated.

As mentioned above, according to the present embodiment, the halftone threshold value table is read from the halftone threshold value storage unit 203 according to the command to define each of the first and second color gradation values. According to the halftone threshold value table, the halftone processing (halftoning) is performed for the first and second colors. The first color halftone pattern value and the second color halftone pattern value obtained through the halftone processing are stored in the first color halftone pattern storage unit 306 and the second color halftone pattern storage unit 307, respectively. Then, the first color halftone pattern value and the second color halftone pattern value which are read from the first color halftone pattern storage unit 306 and the second color halftone pattern storage unit 307, respectively, are selected and output, according to the brush pattern value read from the brush pattern storage unit 204.

Therefore, in the present embodiment, the halftone pattern can be applied efficiently to the drawing objects having the same gradation value. Therefore, there is no need to sequentially access the halftone threshold value storage unit 203 where the halftone threshold value table is stored. Thereby, it is possible to perform the brush treatment more rapidly.

Furthermore, in the present embodiment, the halftone pattern and the brush pattern are sequentially obtained for every drawing word to be drawn, on the basis of the horizontal shift value of the halftone pattern and the horizontal shift value of the brush pattern. Therefore, it is possible to reduce the capacity or capacities of the first color halftone pattern storage unit 306 and the second color halftone pattern storage unit 307 where the halftone pattern is stored, and the brush pattern storage unit 204 where the brush pattern is stored.

According to the present invention, the brush treatment can be performed with lesser memory capacity.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
a first storage unit configured to be accessed on the basis of a predetermined unit in X direction which is a direction along a horizontal line, and configured to store a first halftone pattern subjected to a halftone processing for a first color gradation value;
a second storage unit configured to be accessed on the basis of a predetermined unit in the X direction, and configured to store a second halftone pattern subjected to a halftone processing for a second color gradation value;
a third storage unit configured to be accessed on the basis of a predetermined unit in the X direction, and configured to store a brush pattern;
a first shift unit configured to shift the first halftone pattern read on the basis of the predetermined unit from the first storage unit to a first direction toward a drawing start point on the horizontal line according to a drawing position on the horizontal line, further add the first halftone pattern to a second direction toward a drawing end point on the horizontal line, and output it on the basis of the predetermined unit;
a second shift unit configured to shift the second halftone pattern read on the basis of the predetermined unit from the second storage unit to the first direction according to the drawing position, further add the second halftone pattern to the second direction, and output it on the basis of the predetermined unit;
a third shift unit configured to shift the brush pattern read on the basis of the predetermined unit from the third storage unit to the first direction according to the drawing position, further add the brush pattern to the second direction, and output it on the basis of the predetermined unit; and
a brush synthesizing unit configured to select, pixel by pixel, which one of the first halftone pattern based on the predetermined unit output from the first shift unit and the second halftone pattern based on the predetermined unit output from the second shift unit should be output, according to the brush pattern based on the predetermined unit output from the third shift unit.

2. The image processing device according to claim 1, wherein
in the first storage unit, the first halftone pattern is repeatedly stored in the X direction so that a X direction width of the first halftone pattern becomes maximum within a X direction width of the predetermined unit,
in the second storage unit, the second halftone pattern is repeatedly stored in the X direction so that a X direction width of the second halftone pattern becomes maximum within a X direction width of the predetermined unit, and
in the third storage unit, the brush pattern is repeatedly stored in the X direction so that a X direction width of the brush pattern becomes maximum within a X direction width of the predetermined unit.

3. The image processing device according to claim 2, wherein
the first shift unit shifts and adds the first halftone pattern to a position obtained by subtracting, from the X direction width of the predetermined unit, (i) a shift amount corresponding to the drawing position and (ii) a residue value when the X direction width of the predetermined unit is divided by a repeated width of the first halftone pattern,
the second shift unit shifts and adds the second halftone pattern to a position obtained by subtracting, from the X direction width of the predetermined unit, (i) a shift amount corresponding to the drawing position and (ii) a residue value when the X direction width of the predetermined unit is divided by a repeated width of the second halftone pattern, and
the third shift unit shifts and adds the brush pattern to a position obtained by subtracting, from the X direction width of the predetermined unit, (i) a shift amount corresponding to the drawing position and (ii) a residue value when the X direction width of the predetermined unit is divided by a repeated width of the brush pattern.

4. The image processing device according to claim 1, further comprising:
a halftone pattern generating unit configured to compare each of the first gradation value and the second gradation value with a halftone threshold value stored in a halftone threshold value storage unit, generate the first halftone pattern based on the first color gradation value and the second halftone pattern based on the second gradation value, store the first halftone pattern in the first storage unit, and store the second halftone pattern in the second storage unit.

5. An image processing method comprising:
a first shifting for shifting a first halftone pattern subjected to a halftone processing for a first color gradation value, the first halftone pattern being read on the basis of a predetermined unit from a first storage unit configured to be accessed on the basis of the predetermined unit in X direction which is a direction along a horizontal line and configured to store the first halftone pattern, to a first direction toward a drawing start point on the horizontal line according to a drawing position on the horizontal line, further adding the first halftone pattern to a second direction toward a drawing end point on the horizontal line, and outputting it on the basis of the predetermined unit;
a second shifting for shifting a second halftone pattern subjected to a halftone processing for a second color gradation value, the second halftone pattern being read on the basis of a predetermined unit from a second storage unit configured to be accessed on the basis of the predetermined unit in the X direction and configured to store the second halftone pattern, to the first direction according to the drawing position, further adding the second halftone pattern to the second direction, and outputting it on the basis of the predetermined unit;
a third shifting for shifting a brush pattern, the brush pattern being read on the basis of a predetermined unit from a third storage unit configured to be accessed on the basis of the predetermined unit in the X direction and configured to store the brush pattern, to the first direction according to the drawing position, further adding the brush pattern to the second direction, and outputting it on the basis of the predetermined unit; and
a brush synthesizing for selecting, pixel by pixel, which one of the first halftone pattern based on the predetermined unit output from the first shifting and the second halftone pattern based on the predetermined unit output from the second shifting should be output, according to the brush pattern based on the predetermined unit output the third shafting.

6. An image forming apparatus comprising:
the image processing device according to claim 1; and
an image forming unit configured to form an image on a printing medium according to an output from the brush synthesizing unit.

* * * * *